United States Patent
McKenney et al.

(10) Patent No.: US 6,779,090 B2
(45) Date of Patent: Aug. 17, 2004

(54) SPINLOCK FOR SHARED MEMORY

(75) Inventors: Paul E. McKenney, Beaverton, OR (US); William L. Irwin, III, Hillsboro, OR (US); Swaminathan Sivasubramanian, Ames, IA (US); John G. Stultz, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 10/063,876

(22) Filed: May 21, 2002

(65) Prior Publication Data

US 2003/0221071 A1 Nov. 27, 2003

(51) Int. Cl.⁷ .............................................. G06F 12/00
(52) U.S. Cl. ...................... 711/152; 711/151; 710/200; 710/220; 710/240; 710/241; 710/244; 707/8; 707/9
(58) Field of Search .............................. 711/151, 152; 710/200, 220, 240, 241, 244; 707/8, 9

(56) References Cited

U.S. PATENT DOCUMENTS 5,832,484 A * 11/1998 Sankaran et al. .............. 707/8
6,473,819 B1   10/2002 Jackson et al.
6,480,918 B1   11/2002 McKenney et al.
6,546,443 B1 *  4/2003 Kakivaya et al. ........... 710/200

OTHER PUBLICATIONS

U.S. patent application Ser. No. 09/883,417, Browning et al., filed Apr. 12, 2001.

U.S. patent application Ser. No. 09/753,062, Rajamony et al., filed Dec. 28, 2000.

* cited by examiner

*Primary Examiner*—Donald Sparks
*Assistant Examiner*—Bao Q Truong
(74) *Attorney, Agent, or Firm*—Law Offices of Michael Dryja

(57) ABSTRACT

A spin lock for shared memory is disclosed. A lock flag for a lock on a memory section is attempted to be set. If the lock flag is successfully set, the lock on the memory section is held so that the memory section may be processed. Upon being ready to release the lock on the memory section, and in response to determining that one or more units are spinning for the lock on the memory section, one of the spinning units is selected, and a spin flag for the selected unit is reset. If no units are spinning for the lock, however, the lock flag for the lock is reset.

12 Claims, 7 Drawing Sheets

SPINLOCK FOR SHARED MEMORY

BACKGROUND OF INVENTION

This invention relates generally to computer systems that have shared memory, and more particularly to locks for such shared memory.

There are many different types of multi-processor computer systems. A symmetric multi-processor (SMP) system includes a number of processors that share a common memory. SMP systems provide scalability. As needs dictate, additional processors can be added. SMP systems usually range from two to thirty-two or more processors. One processor generally boots the system and loads the SMP operating system, which brings the other processors online. Without partitioning, there is only one instance of the operating system and one coherent shared memory space. The operating system uses the processors as a pool of processing resources, all executing simultaneously, where each processor either processes data or is in an idle loop waiting to perform a task. SMP systems increase in speed whenever processes can be overlapped.

A massively parallel processor (MPP) system can use thousands or more processors. MPP systems use a different programming paradigm than the more common SMP systems. In an MPP system, each processor contains its own memory and copy of the operating system and application. Each subsystem communicates with the others through a high-speed interconnect. To use an MPP system effectively, an information-processing problem should be breakable into pieces that can be solved simultaneously. For example, in scientific environments, certain simulations and mathematical problems can be split apart and each part processed at the same time.

A non-uniform memory access (NUMA) system is a multi-processing system in which memory is separated into distinct banks. NUMA systems are similar to SMP systems. In SMP systems, however, all processors access a common memory at the same speed. By comparison, in a NUMA system, memory on the same processor board, or in the same building block, as the processor is accessed faster than memory on other processor boards, or in other building blocks. That is, local memory is accessed faster than distant shared memory. NUMA systems generally scale better to higher numbers of processors than SMP systems. The term building block is used herein in a general manner, and encompasses a separable grouping of processor(s), other hardware, such as memory, and software that can communicate with other building blocks. As used herein, it is synonymous with the term node, but not with the term partition, in that the processors of a node may be partitioned over two or more partitions.

Nearly any type of multi-processor computer system has at least some memory that is shared among the separate processors. Where the shared memory is remote to a given processor, because, for instance, it resides on a different building block than the processor, the memory may also be locally cached to improve performance. In any case, locking should be used to enable orderly access to and modification of the shared data, as may be stored in memory sections, such as memory lines. When a processor requests a lock on a memory section, if no other processor is using the memory section, it is granted to the requesting processor exclusively. Other processors desiring the lock must wait until the processor with the lock releases it. A common arrangement is to require possession of a particular lock before allowing access to a given section of memory, where the processor releases the lock when it is finished with the memory section.

One type of lock is the spin lock. A spin lock can control access to a memory section. A typical spin lock implementation has two phases. In a spin phase, the waiting computational agents, or threads, spin on a cached copy of a single global lock variable. There is usually a one-to-one correspondence between running computational agents, or threads, and processors. However, one computational agent may alternatively encompass two, three or more processors as well. A computational agent is thus used herein in a general sense, and can encompass one or more processors, computer program modules, threads, and so on. In a compete phase, the waiting computational agents all try to atomically modify the lock variable from the available to the held state. The agent that succeeds has control of the lock, and the others go back to the spin phase. The transition from the spin phase to the compete phase is usually initiated when the lock holder releases the lock by marking the lock variable as available.

Spin locks have two primary advantages. They usually require only a few instructions to implement, and they are easily designed to be interruptible. The main disadvantage of spin locks, however, is that they do not scale well. The compete phase in particular can cause significant contention on the system buses when a large number of computational simultaneously attempt to acquire the lock. Spin locks are thus suitable only for lightly contended locks. Additionally, since the locks are not necessarily granted in a first-in, first-out (FIFO) order, spin locks are typically not fair. One or more of the computational agents may ultimately find themselves starved. Such agents, that is, may have to wait a prolonged period of time to obtain access to a lock, even while other agents repeatedly obtain access to the lock. For these and other reasons, therefore, there is a need for the present invention.

SUMMARY OF INVENTION

The invention relates to a spin lock for shared memory. A method of the invention first attempts to set a lock flag for a lock on a memory section. If the method successfully sets the lock flag, the lock on the memory section is held so that the memory section may be processed. Upon being ready to release the lock on the memory section, and in response to determining that one or more units are spinning for the lock on the memory section, the method first selects one of these spinning units. The method then resets a spin flag for the selected unit. If no units are spinning for the lock, however, the method resets the lock flag for the lock.

A system of the invention includes a number of computational agents, a memory shared by the computational agents, and a number of locks. The memory has a number of memory sections. Each lock relates to a corresponding memory section and includes a lock flag and a number of spin flags. The lock flag indicates whether one of the computational agents has locked the corresponding memory section. The spin flags correspond to a number of units to which the agents are assigned. Each spin flag indicates whether at least one of the agents assigned to the unit corresponding to the flag is waiting for the lock.

An article of manufacture of the invention includes a computer-readable medium and means in the medium. The means in the medium is for releasing a lock on a memory section by selecting one of one or more units spinning for the lock, and for releasing a spin flag for the selected unit. Other features and advantages of the invention will become apparent from the following detailed description of the presently preferred embodiment of the invention, taken in conjunction with the accompanying drawings.

BRIEF DESCRIPTION OF DRAWINGS

The drawings referenced herein form a part of the specification. Features shown in the drawing are meant as illustrative of only some embodiments of the invention, and not of all embodiments of the invention, unless otherwise explicitly indicated, and implications to the contrary are otherwise not to be made.

DETAILED DESCRIPTION

Overview

Figure 1:
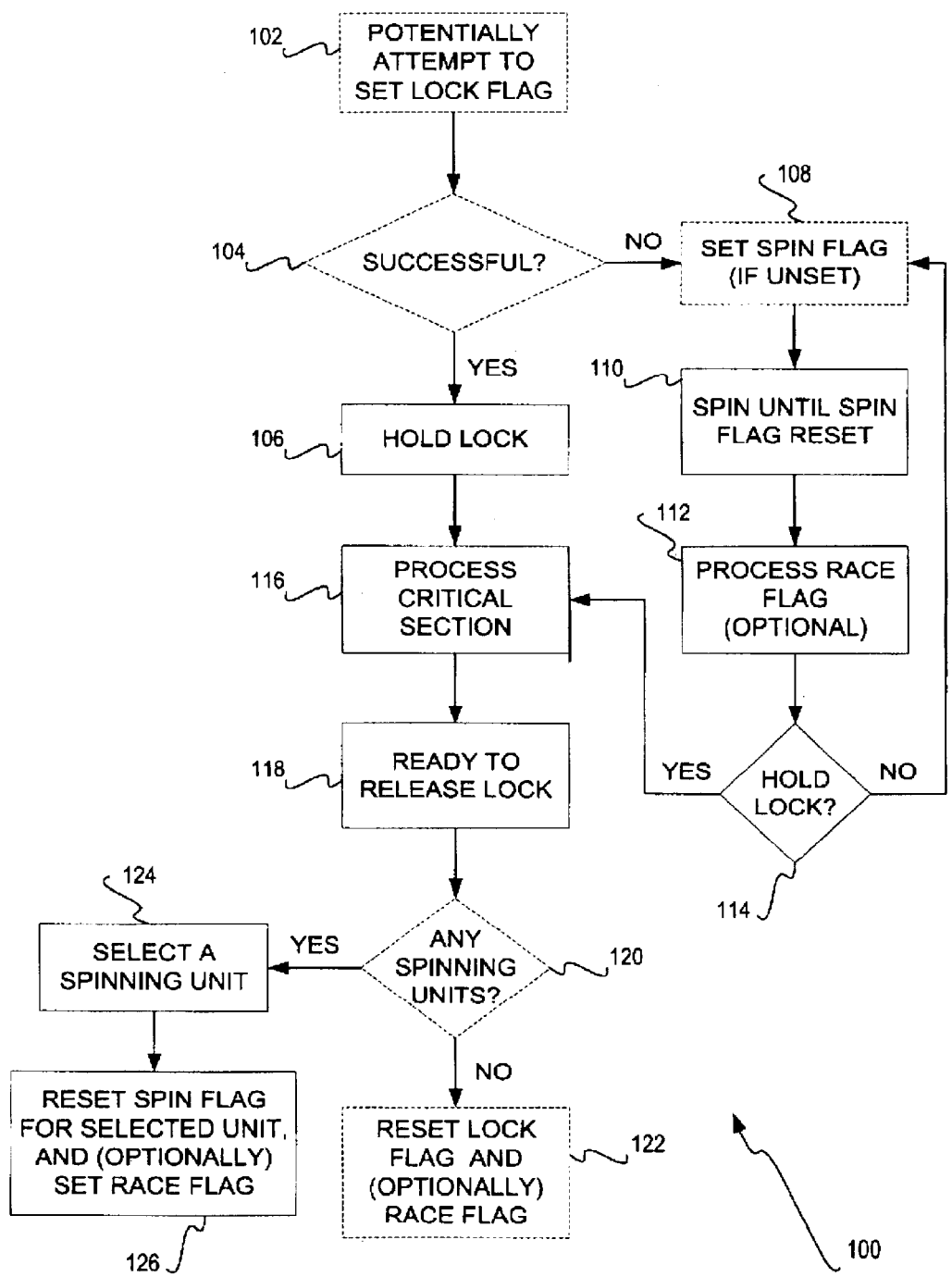
FIG. 1 is a flowchart of a method according to a preferred embodiment of the invention, and is suggested for printing on the first page of the patent.

FIG. 1 shows a method 100 according to a preferred embodiment of the invention. A computational agent, such as one or more processors, desirably performs the method 100. The method 100, as well as other methods of embodiments of the invention, may be implemented as means in a computer-readable medium of an article of manufacture. The computer-readable medium may be a recordable data storage, a modulated carrier signal, or another type of medium.

Parts of the method 100 that are dotted, such as 102, 104, 108, 120, and 122, indicate that the operations of these parts are performed atomically. For x86/ia64-type processors, such atomic operations may be performed using the cmpxchg (atomically compare, and, if equal, exchange) instruction. For reduced-instruction set computer (RISC) processors, such atomic operations may be performed using LL/SC (load link/store conditional) instructions.

The computational agent first potentially attempts to set a lock flag for a lock on a memory section (102). If a race flag does not exist, then the computational agent preferably always attempts to set the lock flag. If a race flag does exist, then the computational agent preferably attempts to set the lock flag only if the race flag is unset. This attempt may be successful or unsuccessful (104). If another computational agent already holds the lock, then the agent performing the method 100 will be unsuccessful. If the lock is not already held by another computational agent, then this computational agent is likely to be successful. If the computational agent does not even attempt to set the lock flag, because the race flag is set, then the attempt to set the lock flag in 104 is also considered unsuccessful. The lock flag may be a single bit, which may be set by atomically attempting to place a value of one or zero in the bit, and may be reset by atomically attempting to place the other of one or zero in the bit.

The race flag may also be a single bit, which may be set by atomically attempting to place a value of one or zero in the bit, and may be reset by atomically attempting to place the other of one or zero in the bit. As will be described in more detail in a subsequent section of the detailed description, if the computational agent performing the method 100 is non-exclusively assigned to the unit to which the spin flag corresponds, then more than one such agent may be waiting. All such agents associated with the unit corresponding to the spin flag that has been reset and that are waiting for the lock race to reset the race flag. The computational agent that succeeds holds the lock, whereas the other, unsuccessful agents continue to spin.

If the attempt to set the lock flag for the lock on the memory section is successful, then the method 100 holds the lock on this memory section (106). The memory section may be one or more memory lines of memory shared among all the computational agents, and may include memory storing data, memory storing computer programs, and so on. If the attempt to set the lock flag for the lock is unsuccessful, then the computational agent sets the spin flag for its associated unit if presently unset (108). If there is a race flag, then the agent sets the spin flag only if the race flag is also unset, where the agent spins, if necessary, until the race flag becomes unset. Like the lock flag, the spin flag may be a single bit, which may be set by atomically attempting to place a value of one or zero in the bit, and may be reset by atomically attempting to place the other of one or zero in the bit.

The computational agent is associated or otherwise assigned exclusively or non-exclusively with what is referred to herein as a unit, and there is a spin flag for every unit. In one embodiment, exclusive association between an agent and a unit means that each computational agent, such as each processor of the system, has its own unit, and the computational agent will have to set the spin flag in 108, since no other agent can. In another embodiment, non-exclusive association between an agent and a unit means that each unit has more than one computational agent assigned to it. For example, each node of a system may be associated with its own unit, where each node has a number of processors. As another example, each partition of a system may be associated with its own unit. Thus, another computational agent assigned to the same unit may have already set the spin flag, such that the agent performing the method 100 does not have to in 108.

The computational agent spins on the spin flag until the spin flag is reset by another computational agent that is releasing the lock (110). The term spinning generally means that the computational agent waits for the lock to be released in some manner. For instance, the computational agent may be able to perform other tasks while waiting, such that an interrupt is generated indicating to the agent that the spin flag has been reset. The term spinning may encompass other types of waiting as well.

Alternatively, if a race flag exists, the method 100 then processes the race flag (112). However, if the computational agent performing the method 100 is exclusively assigned to the unit to which the spin flag corresponds, then there is no need for a race flag. This is because resetting the spin flag by the lock-releasing computational agent signals only to the agent performing the method 100 that the lock is now available. The agent performing the method 100 thus does not have to race against any other computational agent to obtain the lock for the memory section.

Therefore, the computational agent performing the method 100 either holds or does not hold the lock (114). If the spin flag reset in 110 is associated with a unit that has only one waiting computational agent the agent performing the method 100 then this agent always will hold the lock in 114. However, if the spin flag reset in 110 is associated with a unit that has more than one waiting agent, then the agent performing 100 may not always hold the lock in 114. If the lock is not held, then the method 100 proceeds back to 108, where the described process of 110 and 112 is repeated.

Where the lock for the memory section is held, then the method 100 proceeds to 116. The method 100 also proceeds to 116 if the computational agent performing the method 100 holds the lock in 106. The computational agent performing the method 100 thus processes the memory section on which it has obtained the lock (116). The memory section that is processed is referred to as a critical section, and is the code that is executed while the lock is held, as can be appreciated by those of ordinary skill within the art. Processing is used in a general sense herein, and can include reading data from the memory section, writing data to the memory section, executing program instructions from the memory section, and so on.

After processing, the computational agent is ready to release the lock on the memory section (118). The agent determines whether there are any spinning units waiting for the lock (120). The spinning units, as has been described, can correspond to individual agents waiting for the lock, or to one or more nodes, partitions, or other units, having waiting agents. The agent determines whether there are any spinning units by examining whether any spin flags of the lock for the memory section are still set. If not, then there are no agents waiting for the lock, and the computational agent performing the method 100 releases the lock by resetting the lock flag for the memory section (122). In embodiments where race flag processing occurs in 112, the race flag is reset in 122 as well.

However, if there are spinning units, then the computational agent performing the method 100 selects one of these spinning units to which to release the lock (124). If each unit corresponds to a different computational agent, then this may be accomplished by proceeding through the spinning units those that have their spin flags set in a round-robin fashion, to ensure that access to the lock is fair and that no agent is starved. Conversely, if each unit corresponds to a number of computational agents, such as on a per-node basis, then the agent performing the method 100 may bias selection towards the unit to which itself is a part, if any other agents of this unit are waiting for the lock, before selecting a different unit. This ensures efficiency in releasing the lock to presumably local computational agents, while not starving agents assigned to other units.

Once a spinning unit has been selected, the computational agent performing the method 100 resets the spin flag for the selected unit (126). If the reset spin flag is exclusively for a single computational agent, then this agent automatically becomes the new holder of the lock for the memory section. However, if the reset spin flag is for a unit encompassing a number of waiting computational agents, then these waiting agents race to reset a race flag, as has been described, to determine which is the new holder of the lock for the memory section. In embodiments where race flag processing occurs in 112, the race flag is set in 126 as well. Preferably, either the race flag is set before the spin flag is reset, or both flags are accordingly modified in one atomic operation.

Technical Background

Figure 2:
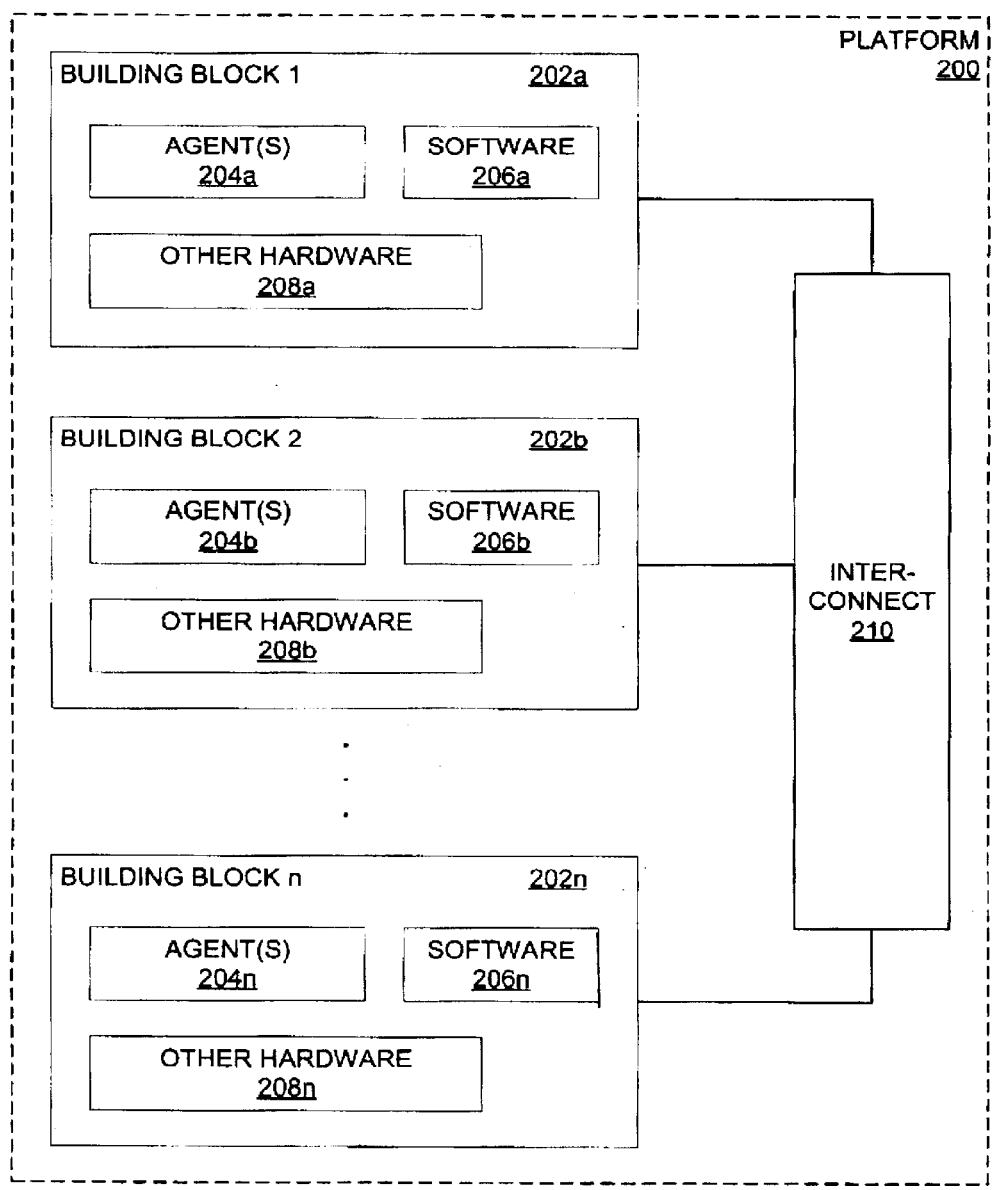
FIG. 2 is a diagram of an example platform having a number of example building blocks connected by an interconnect, in accordance with which embodiments of the invention may be practiced.

FIG. 2 shows an example platform 200 in conjunction with which embodiments of the invention may be practiced. The platform 200 includes a number of example building blocks 202a, 202b, . . . 202n, that are connected to one another via an interconnect 210. Each example building block has one or more computational agents, software, as well as other hardware, such as memory. For instance, the building block 202a has computational agent(s) 204a, software 206a, and other hardware 208a, whereas the building block 202b has computational agent(s) 204b, software 206b, and other hardware 208b. The building block 202n has computational agent(s) 204n, software 206n, and other hardware 208n. A building block can be non-restrictively defined as a grouping of at least one or more computational agents and memory, although the invention is not so limited. Each computational agent preferably encompasses a single processor, but may also encompass more than one processor.

The platform 200 itself can be a non-uniform memory access (NUMA) system, such as a cache-coherent (CC-NUMA) system, a NUMA-quad (NUMA-Q) system, and so on. Where the platform 200 is a NUMA-Q system, each example building block is a quad, or quad building block (QBB), having up to four computational agents, local memory, and input/output (I/O) hardware. The interconnect 210 may be a link. The invention can also be implemented in conjunction with other systems, such as symmetric multi-processor (SMP) systems, and so on. The term platform as used herein is synonymous with the term system.

Figure 3:
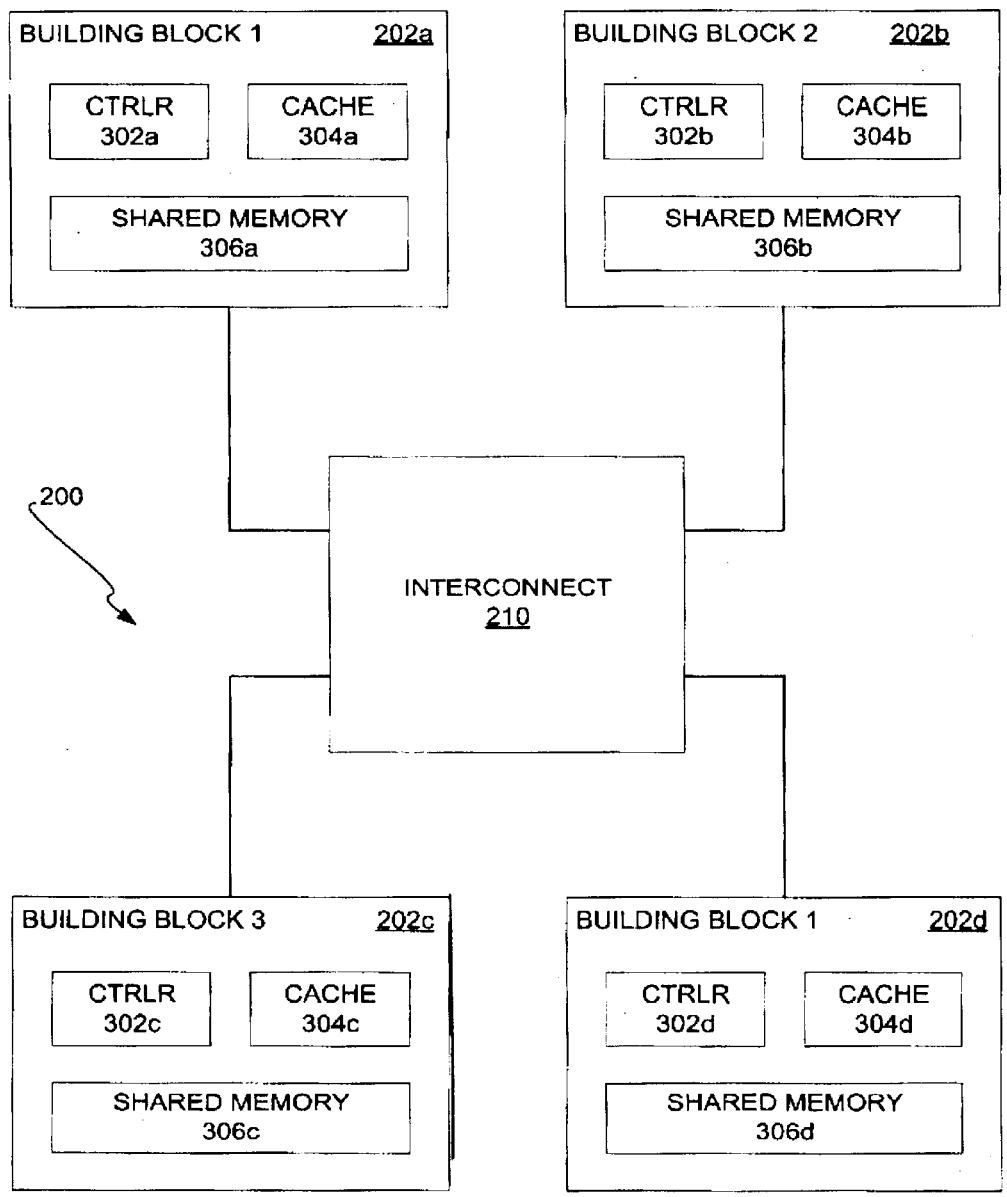
FIG. 3 is another diagram of the example platform of FIG. 2, in which different components of the building blocks and the interconnect are illustrated, and in accordance with which embodiments of the invention may be practiced.

FIG. 3 shows another view of the platform 200 of FIG. 2, specifically the case where there are four building blocks 202a, 202b, 202c, and 202d, connected to an interconnect 210. Each building block has a controller, a cache, and shared memory. That is, the building blocks 202a, 202b, 202c, and 202d have controllers 302a, 302b, 302c, and 302d, respectively, caches 304a, 304b, 304c, and 304d, respectively, and shared memories 306a, 306b, 306c, and 306d, respectively. For descriptive convenience, the term building block 202 refers to any of the building blocks 202a, 202b, 202c, and 202d. Similarly, the term controller 302 refers to any of the controllers 302a, 302b, 302c, and 302d, and the term cache 304 refers to any of the caches 304a, 304b, 304c, and 304d. Likewise, the term shared memory 306 refers to any of the shared memories 306a, 306b, 306c, and 306d.

The controller 302 is a processor or an I/O object, component, or other module that can determine whether a desired memory address is cached in the cache 304. The shared memory 306 is the memory of the building block 202 that is shared with all the other building blocks preferably as a single memory map. The shared memories 306a, 306b, 306c, and 306d constitute primary memory, in distinction to cache memory. The local or remote cache 304 is meant to temporarily store the data for a limited number of memory addresses of the shared memories. The cache 304 has a number of cache entries less than the number of memory entries of the sum of the shared memories 306a, 306b, 306c, and 306d.

One Computational Agent-Per-Unit Embodiment

Figure 4:
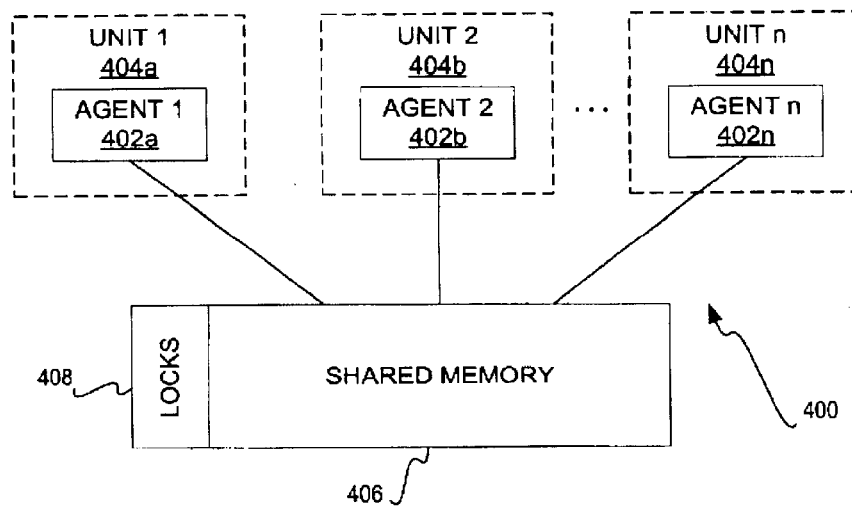
FIG. 4 is a diagram of a system, consistent with the platform of FIGS. 2 and 3, in which each computational agent is assigned or associated with its own unit, according to an embodiment of the invention.

FIG. 4 shows a system 400 according to an embodiment of the invention in which computational agents are exclusively associated with, or assigned to, units. The computational agents 402a, 402b, . . . , 402n are thus exclusively associated with the units 404a, 404b, . . . , 404n, respectively. Each unit in the system 400 has only agent associated therewith. The agents 402a, 402b, . . . , 402n all have access to shared memory 406, for which there are locks 408 governing at least some types of access thereto. The system 400 can be more specifically implemented as the platform 200 of FIGS. 2 and 3 in one embodiment of the invention.

Figure 5:
FIG. 5 is a diagram of a data structure for a lock for a section of memory that can be used in conjunction with the system of FIG. 4, according to an embodiment of the invention.

FIG. 5 shows a lock 500 that can implement each of the locks 408 of FIG. 4, according to an embodiment of the invention. The lock 500 includes a lock flag 502, and a number of spin flags 504a, 504b, . . . 504n. An agent attempts to set the lock flag 502 to gain at least some type of access to a memory section corresponding to the lock 500. Where the flag 502 is set, this means that a computational agent has locked this memory section. Where the flag 502 is unset, this means that a computational agent has not locked this memory section. The spin flags 504a, 504b, . . . , 504n correspond to the units 404a, 404b, . . . , 404n of FIG. 4, respectively, and thus to the computational agents 402a, 402b, . . . , 402n, respectively. When a computational agent is waiting for the lock on the memory section, it sets its corresponding spin flag, and waits until the spin flag is released, indicating that it now holds the lock.

Figure 6:
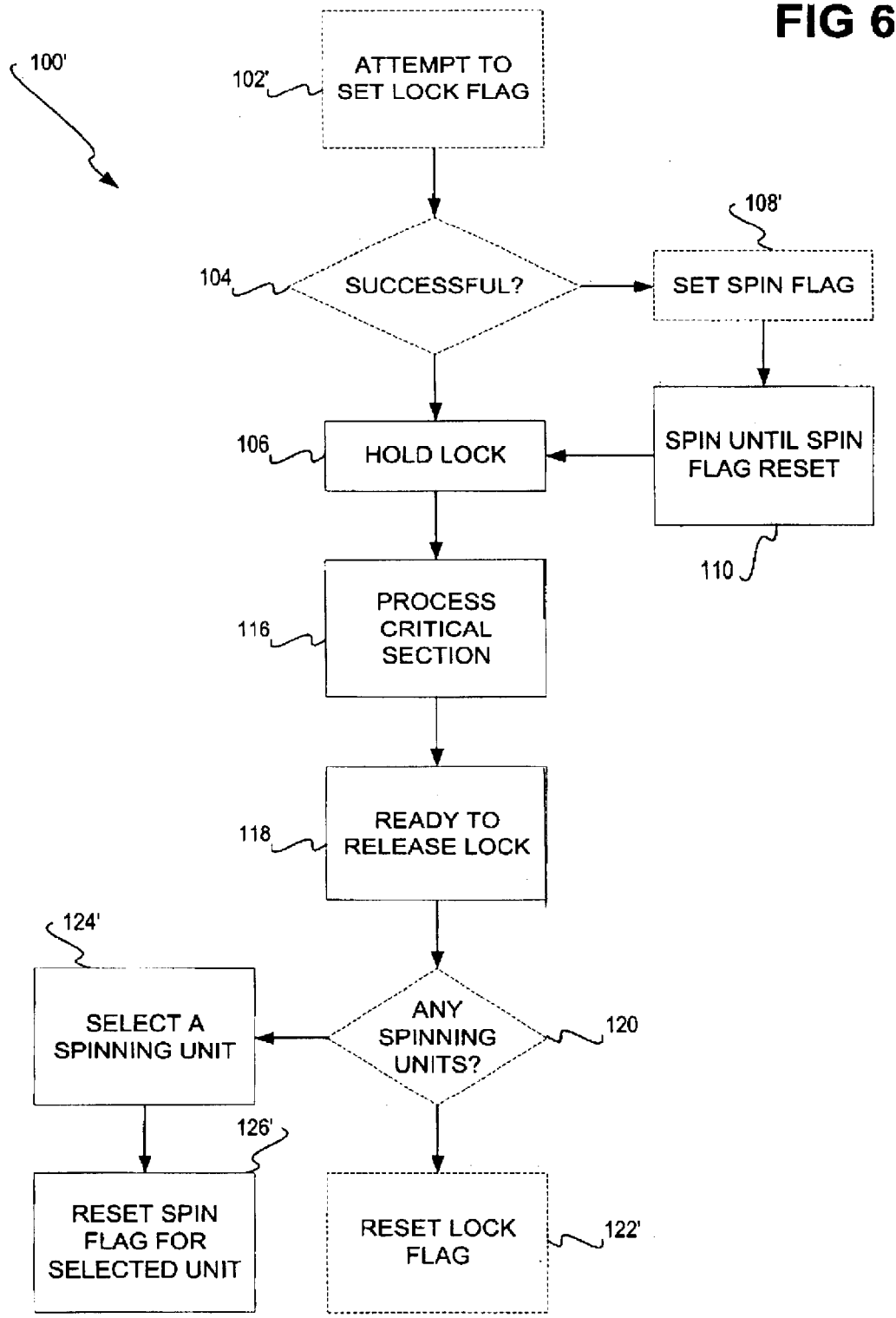
FIG. 6 is a flowchart of a method, consistent with the method of FIG. 1, which can be performed in conjunction with the system of FIG. 4 and the lock of FIG. 5, according to an embodiment of the invention.

FIG. 6 shows a method 100', according to an embodiment of the invention, that is performed by a computational agent that is a part of the system 400 of FIG. 4, using a lock such as the lock 500 of FIG. 5. The method 100' of FIG. 6 is a modified version of the method 100 of FIG. 1. Like-numbered parts of the method 100' as to the method 100 are performed at least substantially identically as have been described in conjunction with the method 100. Like-numbered parts of the method 100' that are appended by apostrophes, such as 102', 108', 122', 124', and 126', are performed somewhat differently, and/or are somewhat more limited, than as have been described in conjunction with the method 100.

A computational agent desiring to obtain a lock for a memory section first attempts to set the lock flag (102'). Because there is no race flag in this embodiment of the invention, the computational agent preferably always attempts to set the lock flag. If successful (104), then the agent holds the lock for the memory section (106). If unsuccessful, then the agent always sets its corresponding spin flag in the lock (108'). Because each unit is associated with only one computational agent, the spin flag for this unit can thus only be set by one computational agent. The computational agent then spins until the spin flag has been reset by the lock-releasing computational agent (110), such that the agent now holds the lock (106).

Once the computational agent holds the lock, it can process the memory section (viz., the critical section) as desired (116), and then is ready to release the lock (118). If there are no spinning units, indicated by correspondingly set spin flags (120), then the agent resets the lock flag (122'). This means that no other computational agents are waiting for the lock, so the lock flag of the lock is reset to release the lock. Because no race flag is set in this embodiment of the invention, there is not a race flag to reset in 122'.

However, if there are spinning units, indicated by correspondingly set spin flags (120), then the computational agent selects one of these units, and hence one of the waiting computational agents, to next receive the lock (124'). The agent cannot select the spin flag for its own unit, since it is the only agent assigned to its unit. Therefore, the agent instead must select a different unit, corresponding to a different computational agent. Preferably this is accomplished in a round-robin manner. That is, the agent selects the next spinning unit, and thus the next waiting agent, in order from itself, and starts at the beginning of the units if it does not find a spinning unit.

For example, there may be thirty-two computational agents numbered 1 through 32, where the agent performing the method 100 is agent #16. If agent #25 is the next waiting agent, signified by a corresponding unit spinning on a correspondingly set spin flag, then agent #16 selects this agent. However, if none of the agents numbered 17 through 32 are waiting for the lock, then agent #16 starts over at agent #1, and proceeds through these agents until it finds a waiting agent. This approach can alternatively be followed in reversed, where agent #16 first examines agents numbered 15 through 1 before it starts over at agent #32. Furthermore, other approaches, besides round-robin approaches, can be used to select a different computational agent.

Once the computational agent performing the method 100 selects a spinning unit, it then resets the spin flag for the selected unit (126'). Resetting the spin flag for the selected unit signals to the corresponding waiting agent that the lock has been released to it. For the computational agent performing the method 100, however, current activity is finished as to the lock. Because no race flag is set in this embodiment of the invention, there is not a race flag to set in 126'.

Potentially More Than One Computational Agent-per-Unit Embodiment

Figure 7:
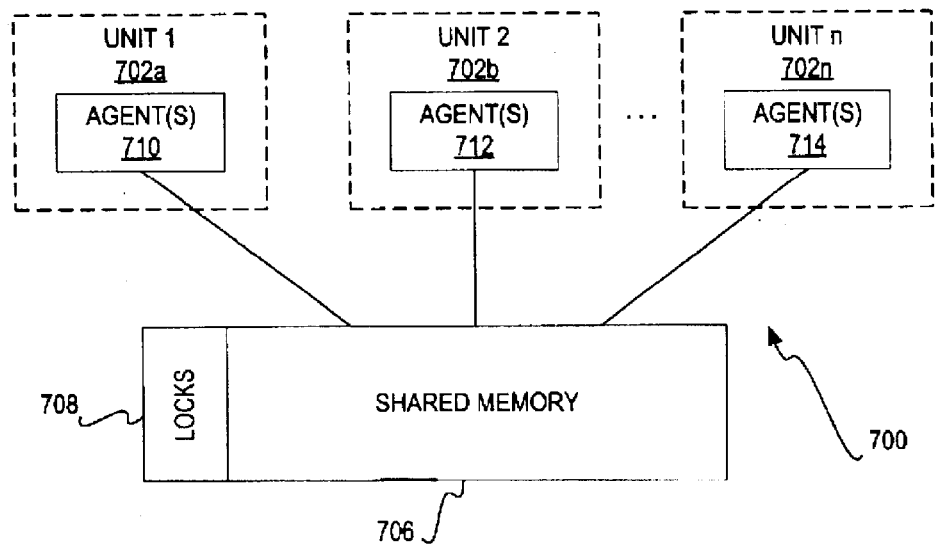
FIG. 7 is a diagram of a system, consistent with the platforms of FIGS. 2 and 3, in which more than one computational agent can be assigned to or associated with a unit, according to an embodiment of the invention.

FIG. 7 shows a system 700 according to an embodiment of the invention in which computational agents are non-exclusively associated with, or assigned to, units. The computational agents 702a, 702b, . . . , 702n can thus each have a number of computational agents assigned thereto or associated therewith. In FIG. 7, the unit 702a has agent(s) 710 assigned thereto, the unit 702b has agent(s) 712, and the unit 702n has agent(s) 714. The agent(s) 710, agent(s) 712, and the agent(s) 714 may correspond to different nodes, partitions, or other groupings of agents. The agents all have access to shared memory 706, for which there are locks 708 governing at least some types of access thereto. The system 700 can be more specifically implemented as the platform 200 of FIGS. 2 and 3 in one embodiment of the invention.

Figure 8:
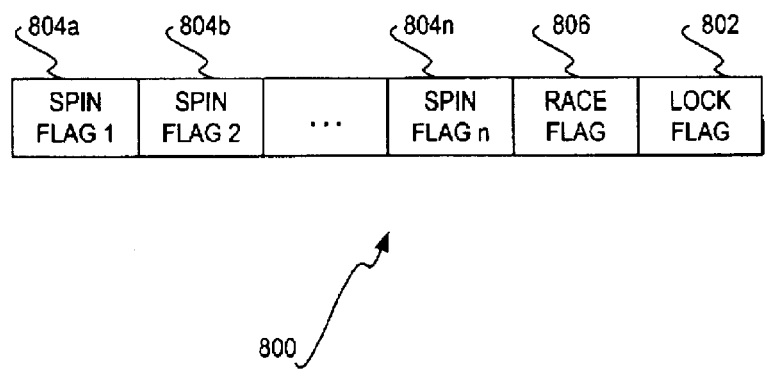
FIG. 8 is a diagram of a data structure for a lock for a section of memory that can be used in conjunction with the system of FIG. 7, according to an embodiment of the invention.

FIG. 8 shows a lock 800 that can implement each of the locks 708 of FIG. 7, according to an embodiment of the invention. The lock 800 includes a lock flag 802, a number of spin flags 804a, 804b, . . . , 804n, and a race flag 806. An agent attempts to set the lock flag 802 to gain at least some type of access to a memory section corresponding to the lock 800. Where the flag 802 is set, this means that a computational agent has locked this memory section. Where the flag 802 is unset, this means that a computational agent has not locked this memory section. The spin flags 804a, 804b, ..., 804n correspond to the units 702a, 702b, ... 702n of FIG. 7, and thus do not exclusively individually correspond to computational agents.

When a computational agent is waiting for the lock on the memory section, it sets the spin flag corresponding to its unit if the spin flag has not already been set by another agent of the same unit. When the spin flag is released, this indicates to each computational agent of the corresponding unit waiting for the lock that it is now to race against the other waiting agents of the unit for the lock. These agents race to reset the race flag 806. If only one computational agent of the unit is waiting, then it of course wins the lock. The agent that successfully resets the race flag 806 first wins the lock on the memory section, and any unsuccessful, losing agents continue to spin by again setting the spin flag for their unit.

Figure 9:
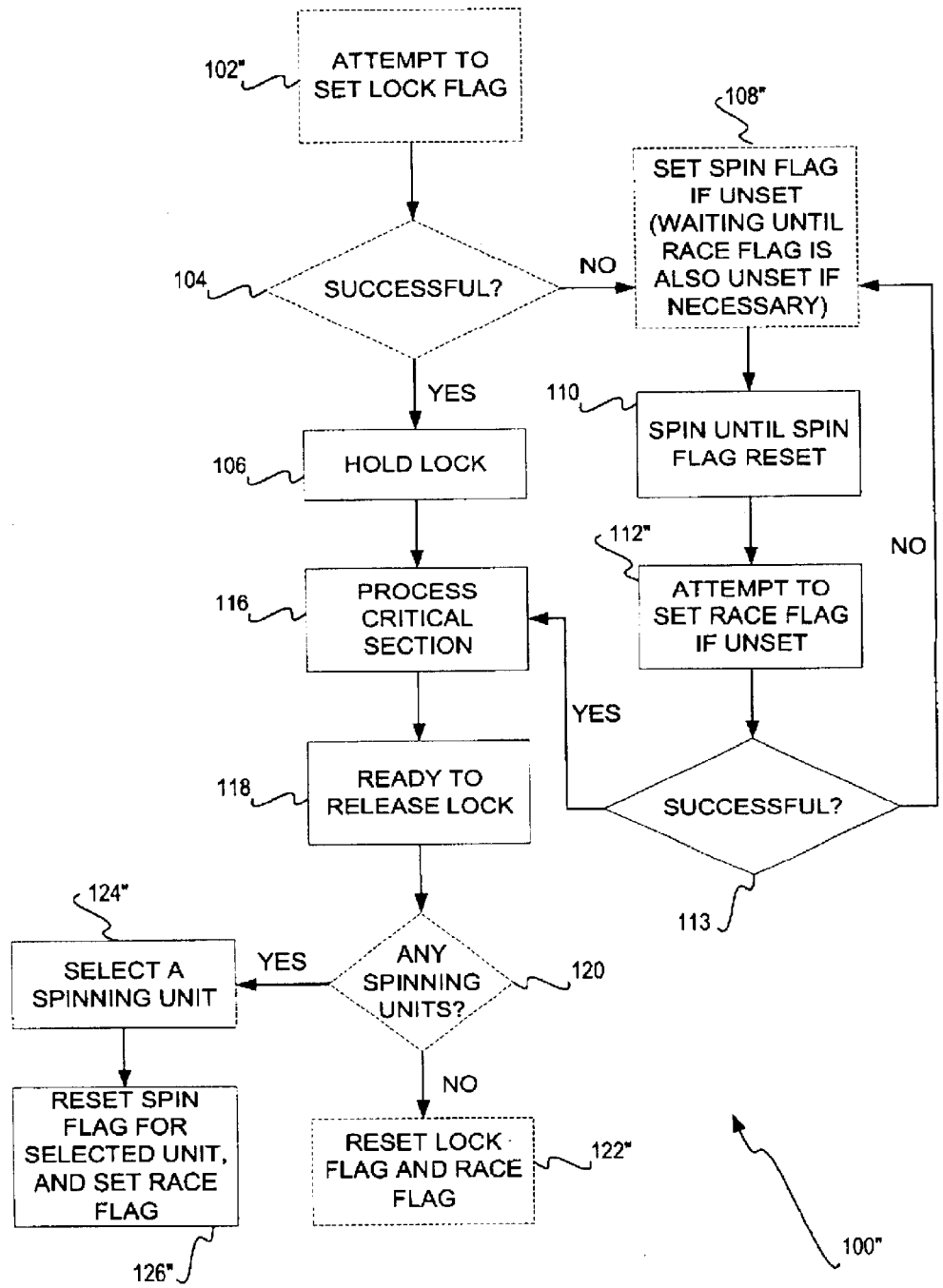
FIG. 9 is a flowchart of a method, consistent with the method of FIG. 1, which can be performed in conjunction with the system of FIG. 7 and the lock of FIG. 8, according to an embodiment of the invention.

FIG. 9 shows a method 100", according to an embodiment of the invention, which is performed by a computational agent that is part of the system 700 of FIG. 7, using a lock such as the lock 800 of FIG. 8. The method 100" of FIG. 9 is a modified version of the method 100 of FIG. 1. Like-numbered parts of the method 100" as to the method 100 are performed at least substantially identically as have been described in conjunction with the method 100. Like-numbered parts of the method 100" that are appended by double-quotes, such as 102", 108", 112", 122", 124", and 126", are performed somewhat differently, and/or are somewhat more limited, than as have been described in conjunction with the method 100.

A computational agent desiring to obtain a lock for a memory section first attempts to set the lock flag (102"), if the race flag is unset. If successful (104), then the agent holds the lock for the memory section (106). If unsuccessful, then the agent sets the spin flag in the lock corresponding to its unit (108"), but only if the race flag is unset. The agent spins, if necessary, until the race flag becomes unset. The spin flag may have already been set if one or more other agents of the same unit are already waiting for the lock. The computational agent then spins until the spin flag has been reset by the lock-releasing computational agent (110). The agent, along with any other agents of the same unit waiting for the lock, then must attempt to reset the race flag of the lock (112"). If the agent performing the method 100 successfully resets the race flag (113), then it now holds the lock (106). Otherwise, performance of the method 100" reverts back to 108".

Once the computational agent holds the lock, it can process the memory section (viz., the critical section) as desired (116), and then is ready to release the lock (118). If there are no spinning units, indicated by correspondingly set spin flags (120), then the agent atomically resets the lock flag and the race flag (122"). This means that no other computational agents are waiting for the lock, so the lock flag of the lock is reset to release the lock. Similarly, the race flag is reset since no agents will be racing to reset the race flag.

However, if there are spinning units, indicated by correspondingly set spin flags (120), then the computational agent selects one of these units (124"). Preferably, the computational agent is biased towards its own unit, and thus towards other agents of its unit, if the spin flag for its unit is set. Otherwise, the computational agent may select another spinning unit in a round-robin manner as has been described. In one embodiment, the computational agent generates a random number between a minimum and a maximum. If the random number is less than, or alternatively greater than, a given threshold, then the agent selects its own unit if the spin flag therefore is set, and otherwise selects a different unit. In this way, a computational agent may select its own unit, if the spin flag therefore is set, a given percentage of the time.

Once the computational agent performing the method 100 selects a spinning unit, it resets the spin flag for the selected unit, and sets the race flag (126"). Preferably, either the race flag is set before the spin flag is reset, or both flags are modified in a single atomic operation. Resetting the spin flag for the selected unit signals to the corresponding waiting agents of this unit that the lock has been released, and that these agents should race to reset the race flag to try to obtain the lock. For the computational agent performing the method 100, however, current activity is finished as to the lock.

Advantages Over the Prior Art

Embodiments of the invention allow for advantages over the prior art. In the embodiment of the invention in which computational agents are exclusively assigned to units, the spin lock is topologically independent. Computational agents are not starved for locks, since it is guaranteed that an agent will receive the lock at some point once it starts spinning on its spin flag. This embodiment of the invention thus ensures fairness in lock allocation. In the embodiment of the invention in which computational agents are non-exclusively assigned to units, the spin lock is not topologically independent. Although computational agents can in theory be starved for locks, in practice they likely will not be. The topological awareness of this embodiment of the invention ensures efficiency in operation as well, since a lock is preferably more likely to revert to another agent of the same unit than to an agent of another unit once it is released.

Alternative Embodiments

It will be appreciated that, although specific embodiments of the invention have been described herein for purposes of illustration, various modifications may be made without departing from the spirit and scope of the invention. For instance, embodiments of the invention may be practiced in conjunction with any type of system having shared memory, and not just a non-uniform memory-access (NUMA) system. Accordingly, the scope of protection of this invention is limited only by the following claims and their equivalents.

What is claimed is:

1. A method comprising:
   attempting to set a lock flag for a lock on a memory section;
   in response to successfully setting the lock flag,
      holding the lock on the memory section;
      processing the memory section;
      upon being ready to release the lock on the memory section, and in response to determining that one or more units are spinning for the lock on the memory section,
      selecting one of the one or more units;
      resetting a spin flag for the one of the one or more units;
      otherwise, resetting the lock flag for the lock on the memory section;
   in response to unsuccessfully setting the lock flag,
      setting a spin flag for a corresponding unit;
      spinning until the spin flag for the corresponding unit is reset;
      attempting to reset a race flag for the lock; and,
      in response to successfully resetting the race flag, holding the lock on the memory section.

2. The method of claim 1, further comprising, after spinning until the spin flag for the corresponding unit is reset, holding the lock on the memory section;

processing the memory section;

upon being ready to release the lock on the memory section, and in response to determining that one or more second units are spinning for the lock on the memory section, selecting one of the one or more second units;

resetting a spin flag for the one of the one or more second units; and, otherwise, resetting the lock flag for the lock on the memory section.

3. The method of claim 1, further comprising, after holding the lock on the memory section, processing the memory section;

upon being ready to release the lock on the memory section, and in response to determining that one or more second units are spinning for the lock on the memory section;

selecting one of the one or more second units;

resetting a spin flag for the one of the one or more second units; and, otherwise, resetting the lock flag for the lock on the memory section.

4. The method of claim 1, further comprising, in response to unsuccessfully resetting the race flag, setting the spin flag for the corresponding unit if currently unset;

spinning until the spin flag for the corresponding unit is reset;

attempting to reset the race flag for the lock;

in response to successfully resetting the race flag, holding the lock on the memory section.

5. The method of claim 1, further comprising, after holding the lock on the memory section, processing the memory section;

upon being ready to release the lock on the memory section, and in response to determining that one or more second units are spinning for the lock on the memory section, selecting one of the one or more second units;

setting the race flag;

resetting a spin flag for the one of the one or more second units;

otherwise, resetting the lock flag for the lock on the memory section; and, resetting the race flag.

6. The method of claim 1, wherein processing the memory section comprises processing a critical section of the memory section.

7. A system comprising:

a plurality of computational agents;

a memory shared by the plurality of computational agents and having a plurality of memory sections;

a plurality of locks, each lock relating to a corresponding memory section of the plurality of memory sections of the memory and comprising:

a lock flag indicating whether one of the plurality of computational agents has locked the corresponding memory section; and, a plurality of spin flags corresponding to a plurality of units to which the plurality of computational agents are assigned, each spin flag indicating whether at least one of the plurality of computational agents assigned thereto is waiting for the lock; and a race flag that one or more of the at least one of the plurality of computational agents waiting for the lock race to reset upon resetting of one of the plurality of spin flags to which the at least one of the plurality of computational agents correspond, wherein the plurality of units are lesser in number than the plurality of computational agents, such that each of the plurality of spin flags of each of the plurality of locks corresponds to at least one of the plurality of computational agents.

8. The system of claim 7, wherein the plurality of units individually correspond to the plurality of computational agents, such that each of the plurality of spin flags of each of the plurality of locks corresponds to one of the plurality of computational agents.

9. The system of claim 7, wherein the plurality of computational agents are divided into a plurality of nodes, and the plurality of units individually correspond to the plurality of nodes.

10. The system of claim 7, wherein each of the plurality of computational agents comprises a processor, and each of the plurality of memory sections comprises a memory line.

11. An article comprising:

a computer-readable medium; and means in the medium for releasing a lock on a memory section by selecting one of one or more units spinning for the lock on the memory section and resetting a spin flag for the one of the one or more units, wherein the means in the medium is biased towards a given one of the one or more units to which the means is assigned in selecting the one of the one or more units spinning for the lock, and wherein the means in the medium is unbiased towards any of the one or more units in selecting the one of the one or more units spinning for the lock in a round-robin manner.

12. The article of claim 11, wherein the medium is one of a recordable data storage medium and a modulated carrier signal.

* * * * *